C. HENNES.
DRAFT APPLIANCE.
APPLICATION FILED MAR. 29, 1916.
1,207,035.
Patented Dec. 5, 1916.
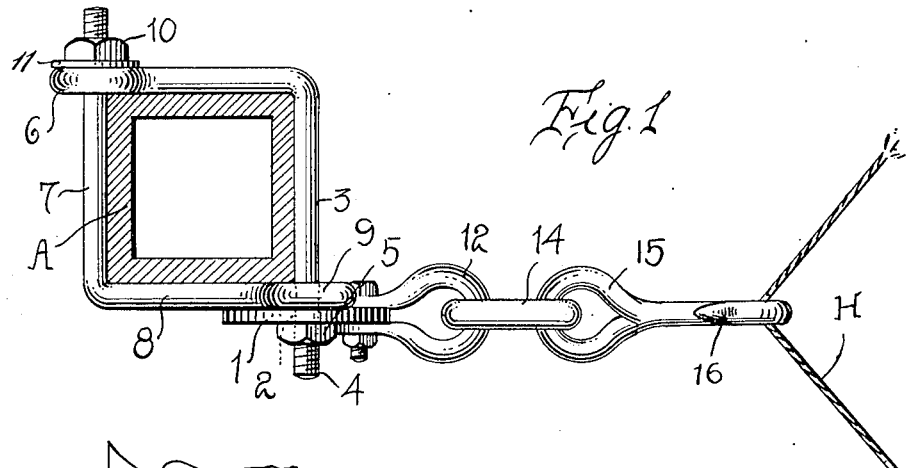
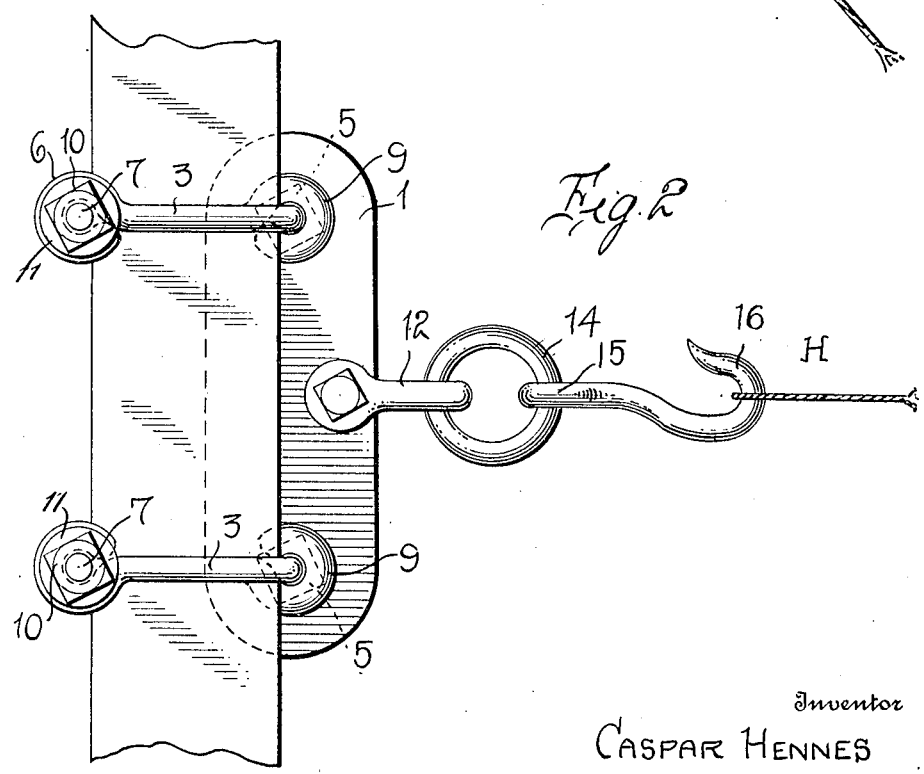
Inventor
CASPAR HENNES
By Watson E. Coleman
Attorney

UNITED STATES PATENT OFFICE.

CASPAR HENNES, OF SCOTTSVILLE, KANSAS.

DRAFT APPLIANCE.

1,207,035.   Specification of Letters Patent.   Patented Dec. 5, 1916.

Application filed March 29, 1916. Serial No. 87,564.

*To all whom it may concern:*

Be it known that I, CASPAR HENNES, a citizen of the United States, residing at Scottsville, in the county of Mitchell and State of Kansas, have invented certain new and useful Improvements in Draft Appliances, of which the following is a specification, reference being had to the accompanying drawings.

This invention relates to certain improvements in draft appliances and it is an object of the invention to provide a novel and improved device of this general character whereby a trailer may be readily and conveniently hitched to a vehicle.

The invention consists in the details of construction and in the combination and arrangement of the several parts of my improved appliance whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in elevation of a draft appliance constructed in accordance with an embodiment of my invention, the coacting axle being indicated in section; and Fig. 2 is a view in top plan of the device as disclosed in Fig. 1.

As disclosed in the accompanying drawings, A denotes the rear axle of a vehicle and to which my improved appliance is adapted to be engaged.

In the present embodiment of my invention, 1 denotes an elongated plate of predetermined dimensions and having produced adjacent its opposite ends the openings 2 through which are adapted to be directed the lower end portions of the upstanding rods 3, the lower extremities of said rods 3 being threaded, as indicated at 4, in order to permit the application thereto of the clamping nuts 5 adapted to coact with the under face of the plate 1 in order to afford a means for effectively connecting the appliance with the axle A.

The upper end portion of each of the rods 3 is disposed on an angle of substantially 90° and adapted to overlie the upper face of the axle A and terminates in an eye 6 through which is adapted to be directed the upstanding portion 7 of the horizontal rod 8 which is adapted to underlie the axle A, the opposite end portion of said rod 8 being provided with an eye 9 through which a rod 3 is directed, said eye 9 being positioned above and adapted to contact with the plate 1. The upper extremity of the upstanding portion 7 is also threaded in order to be engaged by the clamping nut 10 to afford a further means for clamping the appliance to the axle A, and in order to assure the proper coaction between the nut 10 and the eye 6, I find it of advantage to interpose therebetween a conventional washer 11.

Pivotally connected with the plate 1 midway its length is a clip 12 through which is directed an annular member or ring 14 which is also disposed through an eye 15 of a hook member 16, said hook member 16 being directed to be engaged with a hitch H of any conventional form carried by a second vehicle or trailer, whereby it will be perceived that the second vehicle or trailer may be effectively coupled with the first named vehicle. It is also to be noted that the returned portion of the hook member 16 is substantially horizontally disposed when under strain as is clearly illustrated in the accompanying drawings.

From the foregoing description, it is thought to be obvious that an appliance constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with an axle of a vehicle, a draft appliance comprising an elongated plate, a longitudinal marginal portion of which underlies the axle, means coacting with the inner portions of the plate for holding the same in applied position relative to the axle, a clip pivotally engaged with the opposite longitudinal marginal portion of the plate at substantially midway the length thereof, said clip being movable about an axis at right angles to the plate, an annular member loosely directed through the clip, and a hook member provided with an eye through which the annular member is also loosely directed, the annular member and the returned portion of the hook member being substantially horizontal when under strain.

In testimony whereof I hereunto affix my signature in the presence of two witnesses.

CASPAR HENNES.

Witnesses:
  L. A. MERGEN,
  PHOEBE BRENNAN.

Copies of this patent may be obtained for five cents each, by addressing the "Commissioner of Patents, Washington, D. C."